US012715332B2

(12) United States Patent
Heino et al.

(10) Patent No.: US 12,715,332 B2
(45) Date of Patent: Aug. 25, 2026

(54) FORECASTING CHARGING TIME OF ELECTRIC VEHICLES

(71) Applicant: Kempower Oyj, Lahti (FI)

(72) Inventors: Esko Heino, Lahti (FI); Juho-Eemeli Veikkolainen, Lahti (FI)

(73) Assignee: Kempower Oyj, Lahti (FI)

( * ) Notice: Subject to any disclaimer, the term of this patent is extended or adjusted under 35 U.S.C. 154(b) by 182 days.

(21) Appl. No.: 18/685,458

(22) PCT Filed: Sep. 28, 2022

(86) PCT No.: PCT/FI2022/050650
§ 371 (c)(1),
(2) Date: Feb. 21, 2024

(87) PCT Pub. No.: WO2023/052685
PCT Pub. Date: Apr. 6, 2023

(65) Prior Publication Data

US 2025/0128635 A1 Apr. 24, 2025

(30) Foreign Application Priority Data

Sep. 29, 2021 (FI) ..................................... 20216007

(51) Int. Cl.
*B60L 53/65* (2019.01)
*B60L 53/66* (2019.01)
(Continued)

(52) U.S. Cl.
CPC ............... *B60L 53/65* (2019.02); *B60L 53/66* (2019.02); *B60L 53/67* (2019.02); *B60L 53/68* (2019.02); *B60L 2250/16* (2013.01)

(58) Field of Classification Search
CPC ........... B60L 53/65; B60L 53/66; B60L 53/68
See application file for complete search history.

(56) References Cited

U.S. PATENT DOCUMENTS 9,821,677 B2 11/2017 Kim
2012/0013301 A1 1/2012 Gaul
(Continued)

FOREIGN PATENT DOCUMENTS

CN 106447129 A * 2/2017 ............. G06Q 10/04
CN 109447766 A 3/2019
(Continued)

OTHER PUBLICATIONS

CN 106447129 A (Year: 2017).*
(Continued)

*Primary Examiner* — Roy Rhee
(74) *Attorney, Agent, or Firm* — Robert P. Michal, Esq.; Rimon PC

(57) ABSTRACT

The present invention relates to a system and a method for forecasting charging time of electric vehicles. Charging event data is filtered to discard at least one piece of the charging event data or disable use of at least one piece of the charging event data. The remaining charging event data is processed for generating a data collection comprising sample data. A data cluster representing sample data associated with a selected electric vehicle cluster is obtained and a charging time forecasting model is generated on basis of the obtained data cluster using machine learning. A plurality of charging time forecasting models are trained based on a first portion of the data cluster. The best performing charging time forecasting model is selected on basis of a second portion of the data cluster, and the selected charging time forecasting model is tested based on a third portion of the data cluster. The charging time forecasting model is applied on a charging event of an electric vehicle comprised in the selected electric vehicle cluster.

19 Claims, 3 Drawing Sheets

(51) Int. Cl.

| | |
|---|---|
| ***B60L 53/67*** | (2019.01) |
| ***B60L 53/68*** | (2019.01) |

(56) References Cited

U.S. PATENT DOCUMENTS

| | | | | |
|---|---|---|---|---|
| 2012/0245750 | A1 | 9/2012 | Kumar | |
| 2013/0328525 | A1 | 12/2013 | Erger | |
| 2016/0176307 | A1 | 6/2016 | Becker | |
| 2016/0297316 | A1 | 10/2016 | Penilla et al. | |
| 2019/0210468 | A1 | 7/2019 | Wittl | |
| 2019/0263286 | A1 | 8/2019 | Metzger | |
| 2019/0389314 | A1 | 12/2019 | Zhu | |
| 2020/0217679 | A1 | 7/2020 | DeLuca et al. | |
| 2021/0300200 | A1* | 9/2021 | Kunz | B60L 53/68 |
| 2022/0101097 | A1* | 3/2022 | Liu | G06N 20/10 |

FOREIGN PATENT DOCUMENTS

| | | | | |
|---|---|---|---|---|
| CN | 110010987 A | 7/2019 | | |
| CN | 112440805 A | 3/2021 | | |
| CN | 112659930 A | 4/2021 | | |
| CN | 109878369 B | 8/2021 | | |
| DE | 102017207281 A1 | 10/2018 | | |
| DE | 102020205865 A1 * | 11/2021 | B60L 53/62 | |
| EP | 2814687 B1 | 12/2014 | | |
| FI | 20216007 A1 | 3/2023 | | |
| KR | 20160012355 A | 2/2016 | | |
| WO | 2008073453 A1 | 6/2008 | | |
| WO | 2013009178 A2 | 1/2013 | | |
| WO | 2013045449 A2 | 4/2013 | | |
| WO | 2019232625 A1 | 12/2019 | | |

OTHER PUBLICATIONS

DE 102020205865 A1 (Year: 2021).*

Int'l. Search Report from WO 2023/052685 Al, priority PCT/FI2022/050650, Dec. 14, 2022, European Patent Office, NL.

Report from FI Appl. No. 20225687, Feb. 16, 2023, Finnish Patent and Registration Office, Helsinki, FI.

Report from FI Appln. No. 20225573, Feb. 23, 2023, Finnish Patent and Registration Office, Helsinki, FI.

Report from priority FI Appl. No. 20216007, May 13, 2023, Finnish Patent and Registration Office, Helsinki, FI.

Int'l. Search Report from PCT/FI2022/050634, Dec. 5, 2022, European Patent Office, NL.

Int'l. Search Report from PCT/FI2022/050641, Dec. 9, 2022, European Patent Office, NL.

Int'l. Search Report from PCT/FI2022/050639, Dec. 14, 2022, European Patent Office, NL.

Int'l. Preliminary Report on Patentability from priority PCT/FI/2022/050650, Oct. 13, 2023, European Patent Office, NL.

Finnish Patent Application No. 20225687, Second Office Action mailed Mar. 21, 2025.

Finnish Application No. U20204106, (Itkonen, Keijo) Aug. 20, 2020 (Aug. 20, 2020) cited in Finnish Search Report dated May 13, 2022 which was previously cited and considered by Examiner Oct. 27, 2025; Finnish Application No. FI U20204106, published as FI12752 (Y1)—Aug. 20, 2020.

Finnish Office Action (Second Opinion on Patentability) issued by the Finnish Patent and Registration Office in relation to Finnish Application No. 20216007 dated Nov. 7, 2023 (11 pages).

* cited by examiner

20

| txId *string* | sampleTime *ISO8601* | ClusterId *strin* | targetSoc *int* | currentSoc *int* | voltage *int* |
|---|---|---|---|---|---|
| | | | | | |
| | | | | | |

| current *int* | evseMaxPower *int* | chargedEnergy *float* | chargeTime *int* | batteryEstimate *float* |
|---|---|---|---|---|
| | | | | |
| | | | | |

FORECASTING CHARGING TIME OF ELECTRIC VEHICLES

FIELD

The present invention relates to a method, a system and a computer program product related to charging time forecasting. More particularly, the invention concerns charging time forecasting based on data collected from charging events by applying machine learning.

BACKGROUND

A charging event of an electric vehicle typically lasts longer than filling a gasoline tank of a combustion engine vehicle. Increasing number of electric vehicles causes increasingly congested charging sites, where typically most or all charging stations at the charging site are in concurrent use, except at nighttime. This may cause available charging power at the charging site to be distributed between charging stations. Thus, all vehicles do not always receive maximal charging power, and therefore charging events may take longer than expected.

As known in the art, machine learning uses various algorithms to train a model to determine models among a data set comprising identifiers and characteristics. The trained model is then used for forecasting characteristics of a new data set.

A regression-based machine learning model fits a curve or several curves with multidimensional data using some type of error metrics, such as standard error. When several pieces of data can be fitted to the curve, this curve is considered to represent behaviour of the data, and the determined curve can thus be used for forecasting future behaviour of like data in real time. Some examples of known algorithms of regression analysis are linear regression, ridge regression, neural network regression, lasso regression, decision tree regression, random forest, K-nearest neighbors (KNN), support vector machines (SVM), gaussian regression model and polynomial regression.

One example of known machine learning algorithms is a Gradient Boosting Decision Tree (GBDT) algorithm that generates a model that predicts a label based on if-then-else true/false-question tree and by estimating number of questions required to estimate likelihood of making the correct decision. As known in the art, GBDT decision trees can be used in classification for determining a class or to apply regression to forecast a numerical value.

DESCRIPTION OF THE RELATED ART

Patent application CN110010987A discloses remaining charging time prediction technique of an electric car based on big data.

Patent application CN202011348557 discloses an automobile charging method that is based on user habits.

Patent application FI20216007 discloses a method for controlling a charging event on basis vehicle identification.

Patent application CN110010987A discloses a method for predicting residual charging time of electric vehicle based on big data. Battery data uploaded by vehicles is divided randomly to train multiple machine learning models, among which the best prediction model is selected.

SUMMARY

An object is to provide a method and apparatus so as to solve the problem of improving reliability of charging time forecasting. The objects of the present invention are achieved with a method according to the claim 1. The objects of the present invention are further achieved with an apparatus according to the claim 9 and a computer program product according to claim 17.

The preferred embodiments of the invention are disclosed in the dependent claims.

The present invention is based on the idea of using machine learning for generating models for charging time forecasting, which machine learning utilizes not only types of vehicles, brands of vehicles, models of vehicles, initial charging level of the battery, but also external parameters such as operating status of the vehicle, operating conditions of the charging station, configuration of the charging station, temperatures of components of the charging station and/or the vehicle, current weather conditions and operating condition of the battery. Operation status of the vehicle may for example comprise information on whether an energy consuming system of the vehicle such as a heater or air conditioning is on. The system is self-learning and accuracy of predictions improves over time.

According to an aspect of the invention, a method of forecasting charging time of electric vehicles is provided. The method comprises receiving charging event data from a plurality of charge stations over a data communication network, and filtering received charging event data. The filtering is configured to discard at least one piece of the charging event data or disable use of at least one piece of the charging event data. The method comprises processing the remaining charging event data after said filtering to generate a data collection comprising sample data, obtaining from the data collection a data cluster representing sample data associated with a selected electric vehicle cluster, and generating a charging time forecasting model on basis of the obtained data cluster. The charging time forecasting model is generated by a machine learning method that comprises training a plurality of charging time forecasting models based on a first portion of the data cluster, selecting the best performing charging time forecasting model among the plurality of trained charging time forecasting models based on an evaluation performed on basis of a second portion of the data cluster, and testing the selected charging time forecasting model based on a third portion of the data cluster. The method then applies the charging time forecasting model on a charging event of an electric vehicle comprised in the selected electric vehicle cluster.

According to some aspects, the step of processing comprises obtaining samples of the filtered charging event data and pre-processing the obtained samples. The pre-processing comprises at least one of removing effects of dynamical changes in the obtained samples caused by parallel charging events, and enhancing samples in the data collection by adding therein enhancement data determined based on data comprised in the obtained samples.

According to some aspects, the filtering received charging event data comprises discarding or disabling data based on i) determining that charging apparatus configuration associated with a piece of charging event data is not known, ii) discarding overrepresented charging event data such that resulting charging event data represents charging events evenly spread over the year, iii) discarding charging event data associated with preselected charging station power configurations, and/or iv) determining that the charging event data is associated to a charging event involving amount of charging energy and/or charging time that is below a predetermined threshold.

According to some aspect, steps of obtaining a data cluster and generating a charging time forecasting model are repeated to a plurality of different data clusters and a charging time forecasting model to each of the plurality of different data clusters.

According to some aspects, an obtained data cluster is rejected from being used for charging time forecasting model generation if sample data therein is determined to be unreliable.

According to some aspects, the obtained data cluster is filtered to remove one or more samples from the data cluster that are determined to deviate significantly from the majority of samples in the data cluster.

According to some aspects, the plurality of charging time forecasting models are trained using a regression-based machine learning method such as one of linear regression, ridge regression, neural network regression, lasso regression, random forest, KNN model, support vector machines (SVM), gaussian regression, polynomial regression and decision tree regression such as Gradient Boosting Decision Tree (GBDT).

According to some aspects, results of the testing the selected charging time forecasting model are stored along with the respective charging time forecasting model for tracking performance of the charging time forecasting model over time.

According to aspects of the invention a system is provided that is configured to forecast charging time of electric vehicles. The system comprises a plurality of charging stations communicatively coupled to a computer device or computer system over a communication network. The charging station is configured to obtain and send charging event data to the computer device or computer system. The computer device or computer system is configured to receive charging event data from a plurality of charge stations over a data communication network, and to filter received charging event data to discard at least one piece of the charging event data or disable use of at least one piece of the charging event data. The computer device or computer system is configured to process the remaining charging event data after said filtering to generate a data collection comprising sample data, to obtain from the data collection a data cluster representing sample data associated with a selected electric vehicle cluster, and to generate a charging time forecasting model on basis of the obtained data cluster. The charging time forecasting model is generated by a machine learning method performed by the computer device or computer system, the method comprising training a plurality of charging time forecasting models based on a first portion of the data cluster, selecting the best performing charging time forecasting model among the plurality of trained charging time forecasting models based on an evaluation performed on basis of a second portion of the data cluster, and testing the selected charging time forecasting model based on a third portion of the data cluster. The computer device or computer system is configured to provide the charging time forecasting model available to the plurality of charging stations.

The charging station is further configured to apply the charging time forecasting model on a charging event of an electric vehicle comprised in the selected electric vehicle cluster.

According to some aspects, the computer device or computer system is configured to process the remaining charging event data by obtaining samples of the filtered charging event data and pre-processing the obtained samples. The pre-processing comprises at least one of removing effects of dynamical changes in the obtained samples caused by parallel charging events, and enhancing samples in the data collection by adding therein enhancement data determined based on data comprised in the obtained samples.

According to some aspects, the computer device or computer system is configured to filter received charging event data by means of discarding or disabling data based on i) determining that charging apparatus configuration associated with a piece of charging event data is not known, ii) discarding overrepresented charging event data such that resulting charging event data represents charging events evenly spread over the year, iii) discarding the charging event data associated with preselected charging station power configurations, and/or iv) determining that the charging event data is associated to a charging event involving amount of charging energy and/or charging time that is below a predetermined threshold.

According to some aspects, the computer device or computer system is configured to repeat said obtaining a data cluster and generating a charging time forecasting model to a plurality of different data clusters and in order to generate a charging time forecasting model to each of the plurality of different data clusters.

According to some aspects, the computer device or computer system is configured to reject an obtained data cluster from being used for charging time forecasting model generation if sample data therein is determined to be unreliable.

According to some aspects, the computer device or computer system is configured to filter the obtained data cluster to remove one or more samples from the data cluster that are determined to deviate significantly from the majority of samples in the data cluster.

According to some aspects, the computer device or computer system is configured to train the plurality of charging time forecasting models using a regression-based machine learning method such as one of linear regression, ridge regression, neural network regression, lasso regression, random forest, KNN model, support vector machines (SVM), gaussian regression, polynomial regression and decision tree regression such as Gradient Boosting Decision Tree (GBDT).

According to some aspects, the computer device or computer system is configured to store results of the testing the selected charging time forecasting model along with the respective charging time forecasting model for tracking performance of the charging time forecasting model over time.

According to a further aspect, a computer program product comprising computer executable code is provided, that causes a computer device or a computer system to execute the method according to any of the above method aspects.

The present invention has the advantage that it provides more reliable charging time estimates. Reliable forecasting of charging event duration improves user experience by enabling the client to better plan his/her schedules, when either duration of the charging event or queuing time to access a crowded charging station is known in advance. For a charging station operator, reliable charging time forecasting enables estimating charge power and energy consumption as a function of time, and thus enables for example adjustment of power allocation between different charging stations at a charging site. Furthermore, reliable charging time forecasting enables provisioning of time-based services, such as determining price of the charging event in advance, scheduling charging events and reliably estimating queuing time required to access an occupied charging station.

BRIEF DESCRIPTION OF THE DRAWINGS

In the following the invention will be described in greater detail, in connection with preferred embodiments, with reference to the attached drawings, in which.

DETAILED DESCRIPTION

The forecasting model generation process based on charging event data as will be described in the following is preferably performed for a plurality of different clusters of electrical vehicles. In the following, an electric vehicle cluster refers to any determined group of electric vehicles for which a forecasting model is to be generated, and a data cluster refers to charging event data concerning the respective electric vehicle cluster (EV cluster). Grouping of electric vehicles into electric vehicle clusters may be based on any one of types of vehicles, classes of vehicles, brands of vehicles and models of vehicles. Both electric vehicle clusters and data clusters may be partially overlapping. Thus, using a type or class of vehicles as a definition of a data cluster does not disable using at least a portion of the same charging event data as basis for vehicle brand and/or vehicle model-based clusters. For example, charging event data from a SUV of a certain model and brand may be used in a generic SUV class EV cluster, in a respective vehicle brand associated passenger EV cluster as well as in a specific vehicle model EV cluster. Charging time forecasting model generation may be repeated intermittently, such that new charging event forecasting models are generated for example daily, weekly or monthly. Any old/previous charging time forecasting model may be replaced on the condition that the new charging time forecasting model appears to be at least as accurate, preferably more accurate.

Figures 1, 2:
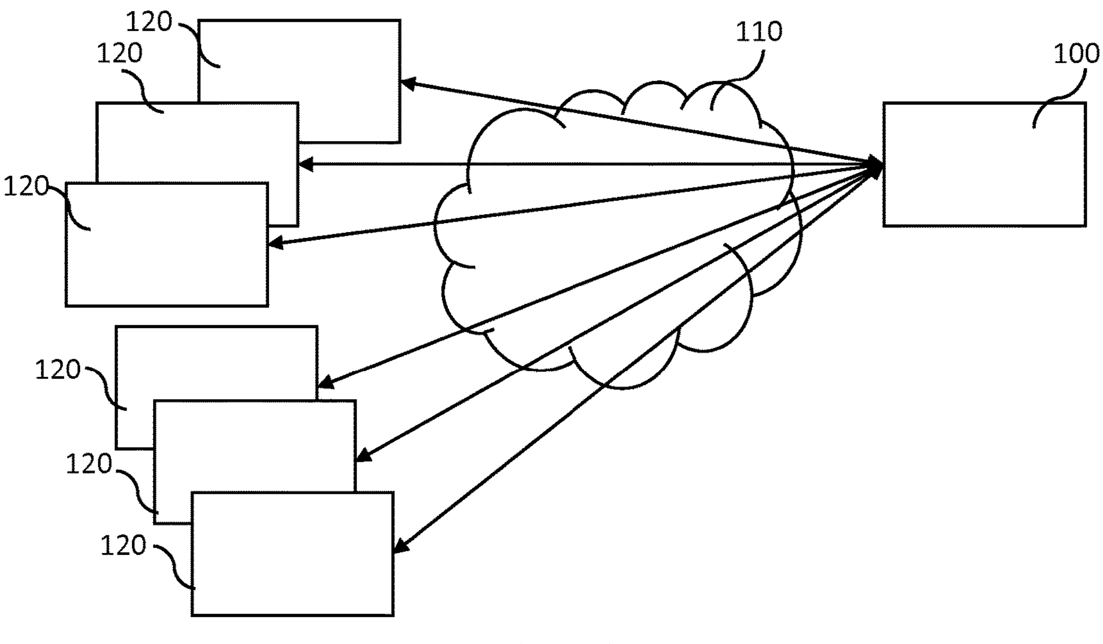
FIG. 1 illustrates a system according to some embodiments
FIG. 2 illustrates parameters of charging event data

The FIG. 1 illustrates an exemplary system according to some embodiments.

Charging stations 120 collect charging event data on charging events. Collected charging event data is sent to a computer device or system 100 over a data communication network 110. The computer device or system 100 may be for example a physical or virtual server or a cloud computing resource. Charging event data obtained by the charging stations may be temporarily stored by the charging station. The computer device or system 100 receives over the data communication network 110 all charging event data, and processes the received charging event data, stores the processed charging event data as samples in a data collection that is used for generating a plurality of charging time forecasting models.

Processing charging event data comprises filtering to obtain filtered charging event data. Filtered charging event data is processed to generate the data collection. Processing comprises sampling and optionally enhancing data samples before storing them into the data collection. Enhancing may comprise determining further data fields into charging event data arrays.

Data obtained from the data collection is clustered and data clusters are further filtered before splitting data in each acceptable, non-filtered data cluster into portions that are used for training, validating and testing charging time forecasting models that are generated on data (and EV) cluster basis. Details of the data filtering and the data enhancing methods as well as the clustering and the charging time forecasting model generation will be described in more detail below.

Generated charging time forecasting models are provided for the charging stations 120 over the data communication network 110 for real-time forecasting charging times of electric vehicles. Charging time estimation model to be applied during a charging event is selected based on detected or determined EV cluster.

The FIG. 2 illustrates parameters of charging event data, herein shown as an exemplary charging event data table 20 in which charging event data arrays are displayed as rows or the data table 20 by the computer device or system 100. The invention is not limited to using a table format, but any known format of data storage is applicable. The exemplary table is divided on two different rows for illustration purposes only; preferably all parameters are part of the same charging event data array stored in the table. Order, data types and names of fields of the data table 20 are exemplary and non-limiting. As illustrated by the FIG. 2, charging event data obtained from each charging event preferably comprises a plurality of charging event data arrays, wherein each data array preferably comprises an individual identifier of the ongoing charging event (txID), a time stamp (sampleTime) preferably formatted according to ISO-8601 standard, an identifier of an EV cluster (clusterId), a target charging level of the battery (targetSoc), a current charging level of the battery (currentSoc), current charging voltage of the battery (voltage), current charging current of the battery (current), the current theoretical maximum charging power of the charging station (evseMaxPower), amount of energy or power already charged during the ongoing charging event (chargedEnergy), time lapsed during the ongoing charging event (chargeTime), an estimate of total net battery capacity of the electric vehicle (batteryEstimate). Additional pieces of data that are not shown in the FIG. 2 but may comprise in the data array received from the charging station are for example ambient temperature (ambientTemp), pin temperature (pinTemp), battery temperature (batteryTemp) and/or other available pieces of system component temperature information. Pin temperature refers to temperature of pins of a plug that combines to the socket of the EV. Furthermore, the data array may comprise one or more pieces of information on EV operations that are active, such as air conditioning or heating. The estimate of total net battery capacity can be determined by integrating electrical current during the charging event, which gives a result as electric charge expressed in Coulombs, which can be translated for example into kWh.

Some exemplary factors that are known to reduce the reliability of charging time forecasting are energy consumed by the electric vehicle during the charging event, operating condition of the battery of the electric vehicle and available charging power from the charging station. During the charging event, the electric vehicle may consume energy for example on warming or cooling, among other things. Some electric vehicles warm or cool the battery for improving charging efficiency, which on the other hand consumes energy. Need for warming or cooling the battery depends at least partly on ambient temperature. Likewise, using any other electrical equipment of the vehicle, such as air conditioning, lights, entertainment, or navigation during the charging event affects duration of the charging event. The method and system according to the current invention is able to estimate effects of energy consumption by the electric vehicle during the charging event. This can be achieved for example by determining loss of energy based on comparing increase of battery charging level to actual amount of charging energy provided by the charging station. This estimate is facilitated by information on total net battery capacity of the EV, which can be obtained from the EV itself or based on vehicle or vehicle cluster identification from a separate, possibly external EV data source. If the charging level increases slower than expected, it can be determined that energy is being consumed from the battery for other functions during the charging event. Loss of energy can be determined for example applying local regression methodology. Estimated loss of energy during the charging event may be included in the data array of the charging event data table 20.

Operating conditions of the battery is an important factor on the battery's capability to receive power during the charging event. For example, internal temperature of the battery has a significant impact on the charging speed, because not only battery capacity but also battery charging voltage changes with temperature. Ambient temperature is a significant factor in internal temperature of the battery. In cold weather during winter temperature of the batter is lower than on warm summer days. One way to estimate operating conditions of the battery is measuring the ambient temperature and using this as a parameter. Ambient temperature may be measured for example by the charging station, or this piece of information may be obtained from any other sources, such as a weather service online. However, the ambient temperature is not the only factor in determining battery temperature. Internal temperature of the battery may be increased for example because the electric vehicle has been driving on a highway recently. Estimation of operating conditions of the battery can further be improved by estimating the internal temperature of the battery based on charging current immediately after initiating the charging event. This enables determining the initial operating conditions of the battery before the initiated charging event itself starts to affect the operating conditions for example by warming up the battery. At least one parameter indicating operating conditions of the battery, such as internal temperature of the battery and/or ambient temperature may be included in the charging event data table 20.

The obtained charging event data is sent over the data communication network to a computer device or system 100 for storing and processing the charging event data by performing filtering and other possible correction and enhancement operations on the received and/or stored data to ensure that data used for generating the charging event forecasting models is not biased and thus provides a proper basis for the model generation.

A charging station that collects charging event data may temporarily store collected charging event data. The charging station may then intermittently send a batch of collected charging event data to the computer device or computer system. For example, charging event data may be obtained by the charging station several times per second, and relevant portions of the obtained charging even data may be sent to the computer device or system for example every second, every minute or every few tens of seconds. According to some embodiments, charging data arrays are stored as charging data schemes, each scheme comprising a plurality of charging event data arrays concerning a charging event. By combining all charging event data of a charging event into a charging data scheme facilitates ease of data processing steps later on in the process, but application of charging data schemes is not necessary. Charging event data sent by the charging stations is preferably stored in a data storage provided by the computer system.

Figure 3:
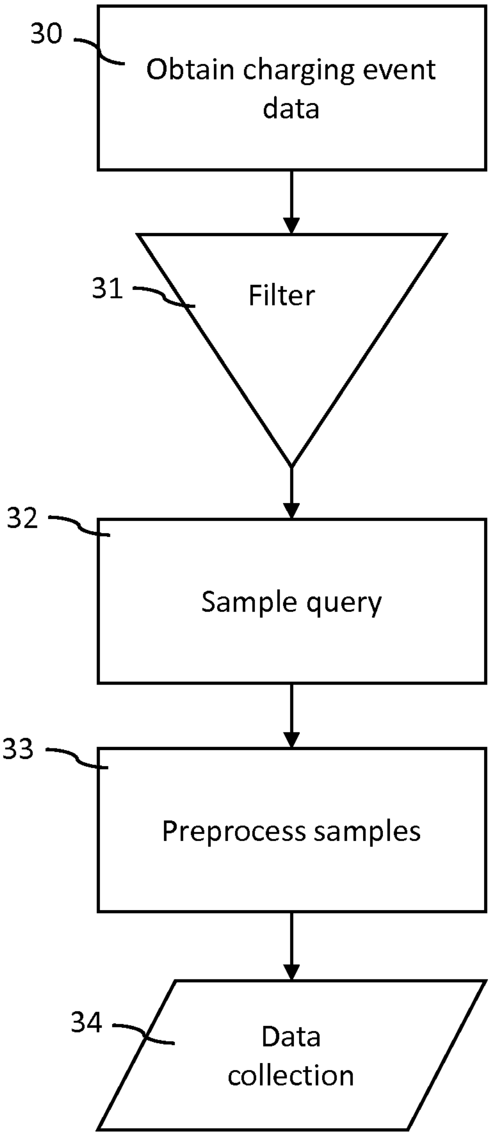
FIG. 3 illustrates a data processing method

The FIG. 3 illustrates exemplary steps of obtaining and processing data into a data collection that is subsequently used for generating a charging time forecasting model. The data collection may be any applicable data storage, such as a database, a table or a dataframe.

The step 30 charging event data is obtained. Charging event data may be collected by the charging stations periodically during ongoing charging events. Several pieces of charging event data are obtained from a single charging event. Preferably, all available, previously stored charging event data is initially obtained for processing.

In the step 31 the charging event data is filtered. Filtering of the obtained charging event data may be performed based on plurality of different filter criteria. Order of applying different filter criteria is a design option. Filtering may be performed by discarding some charging event data altogether or marking it as not to be used for example by flagging. For example, following types of filter criteria can be applied:

i) Charging event data collected from the charging stations is preferably obtained only from charging stations with well-known charging apparatus configurations. Thus, portions of received charging event data may be filtered out from the data to be used for the forecasting model generation process if charging apparatus configuration associated with any specific piece of charging event data is not known.

ii) To determine charging event models capable of accurate forecasting independent of time of year and changes in weather conditions, the filtered charging event data preferably comprises data that evenly represents charging events at all different times of year. This may require filtering of obtained charging event data to implement a selection of charging event data that is evenly spread over the year, in other words discarding charging event data that is overrepresented.

iii) Different power configurations of charging stations affect duration of the charging event. Thus, charging event data related to some power configurations may be filtered so that the filtered charging event data represents all wanted power configurations of charging stations and no type of power configuration is overrepresented.

iv) A very small amount charging energy during a charging event may also distort or skew the charging time forecasting model. Thus, any charging event data related to short charging events or low total charged energy may be filtered out. For example, any charging events that involved less than 5 kWh of energy may be filtered out, or a charging time threshold may be determined.

Preferably, filtering of the charging event data utilizes a plurality of the above filtering conditions, and more preferably all of them.

In the step 32, queries are performed on the filtered charging event data stored at least temporarily in a data storage of the computing device or system. Any method known in the art for querying the filtered charging event data may be applied. Purpose of queries is to obtain samples of the filtered charging event data, which samples exclude charging event data concerning any charging events that were filtered in the step 31.

Obtained samples of filtered charging event data are pre-processed in the step 33.

One purpose of pre-processing samples is to remove effects of dynamical changes caused by parallel charging events.

Any charging events during which the available charging power may have been subject to dynamical changes due to parallel charging events are removed from the query results. In case of such charging events with dynamical changes, query responses concerning any single dynamically changing charging event are split into several charging sub-events, during which the available charging power is approximately constant. If only one charging event has been ongoing at the charging station, amount of available charging power can be considered constant.

This type of pre-processing of samples is not required for samples that are not affected by dynamical changes for example due to parallel charging events, but pre-processing may comprise checking each sample whether a dynamical change has happened and therefore requires the above-described type of pre-processing.

The pre-processing may further comprise enhancing the sample data by adding in the data collection some additional data referred herein to as enhancement data, which can be calculated based on data comprised in the sample data. Exemplary enhancement data fields that are determined and stored in the data collection may comprise total charging time during the current charging event until the sample and change (delta) of the charging status of the battery. Values of enhancement data fields can be calculated on basis of the samples associated with the same charging event, identified by the same charging event identifier (txID).

The pre-processed samples are stored by the computing device in the data collection in the step 35. The data collection comprises all samples that remain after the initially obtained charging event data has been processed by filtering, querying and pre-processing. In the data collection, there are several samples stored for each applicable charging event.

Figure 4:
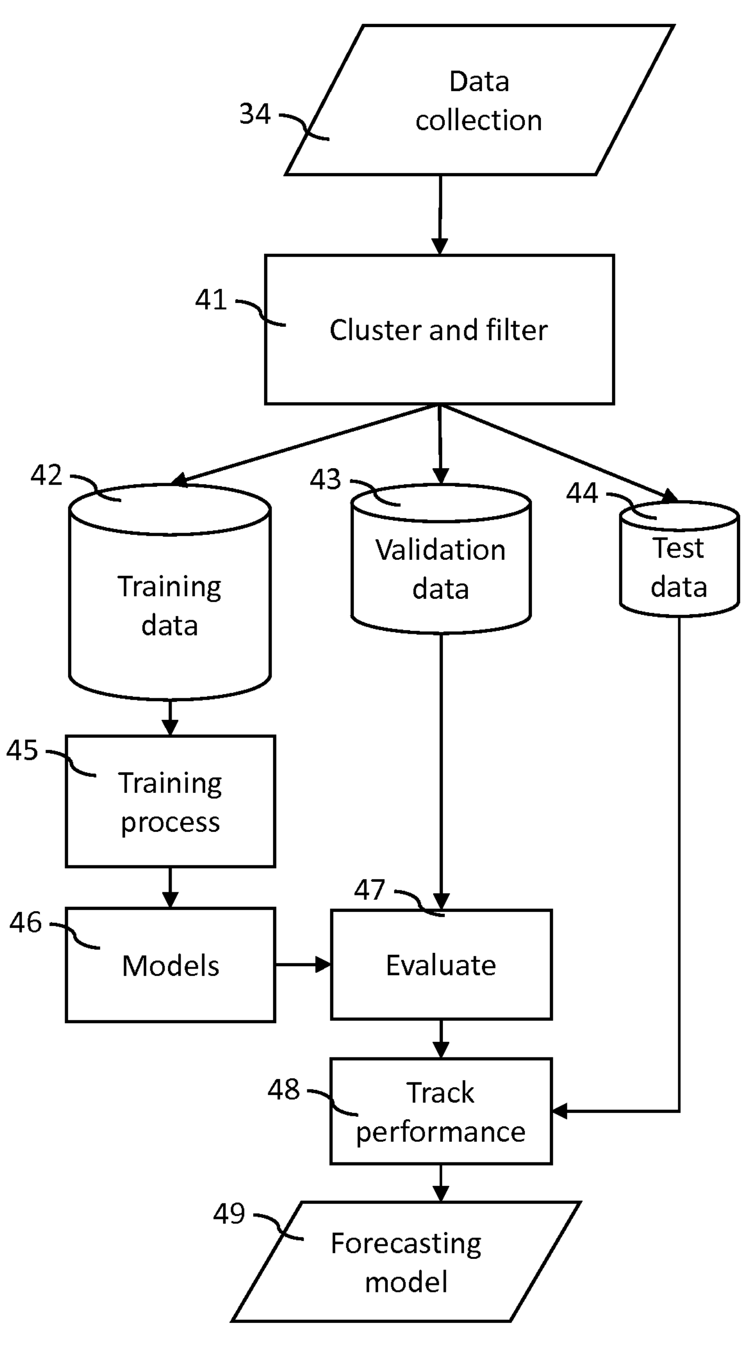
FIG. 4 illustrates a charging time forecasting model generation method

The FIG. 4 illustrates generation of the charging time forecasting model on basis of the data collection.

In the following, the terms sample and sample data refer to data stored in the data collection 34.

Sample data of the data collection is clustered and filtered in the step 41. By clustering we mean that the sample data is divided into a plurality of data clusters, each data cluster comprising sample data concerning a determined electric vehicle cluster. Thus, only samples in the data collection that are relevant for a selected vehicle cluster are used for generating the respective charging time forecasting model.

Some data clusters may be discarded, in other words filtered out as being too uncertain, for example because they do not comprise enough charging events to generate a reliable forecasting model. Rejected data clusters may be returned as part of the received charging event data or as part of the data collection. This way data that was not useful for example because there was initially too little data in the data cluster can be utilized later, after collecting more charging event data so that the cluster becomes big enough to enable reliable charging time forecast generation. Furthermore, data in a data cluster may be filtered by removing one or more samples from the cluster, if found to deviate significantly from other samples in the same data cluster. This may concern for example a sample that indicates a clearly higher or lower charging energy, charging power, charging voltage and/or state of charge (SoC) than any other samples in the cluster. Such outliers caused by exceptional situations could otherwise unnecessarily bias the charging time forecasting model.

Each data cluster comprising sample data concerning charging event data of a respective EV cluster is used for generating the charging time forecasting models by using a machine learning method. The charging time forecasting model generation process is performed individually for each data cluster. In the following, we only discuss processing data of a single cluster, but similar process is performed to each data cluster.

The sample data in the data cluster is divided it is divided into three portions, as illustrated by arrows from the step 41. Preferably, the first portion 42, referred to as training data, is used for training forecasting models. The training data 42 should be the greatest portion of the data cluster, preferably at least 50% of the data comprised in the data cluster. A second portion of the data cluster, referred to as validation data, is used for validating these trained forecasting models. This portion can be smaller than the training data 42 portion. A third portion of the data cluster, referred to as test data 44, is used for testing the validated forecasting models. Test data 44 is preferably the smallest portion.

An exemplary division of data cluster is 70% training data 42 for generating and training the forecasting model, 20% validation data 43 for validating the forecasting model and 10% test data 44 for testing the validated forecasting model.

The training data 42 is used for training a plurality of forecasting models in the step 45. Each forecasting model concerns the same the data cluster. For example, training may be performed by applying a regression-based machine learning method. According to some embodiments, the regression-based machine learning method is Gradient Boosting Decision Tree (GBDT) algorithm. The GBDT generates several models based on the same data set, namely the training data 42. Other applicable regression-based machine learning methods comprise linear regression, ridge regression, neural network regression, lasso regression, decision tree regression, K-nearest neighbors (KNN), support vector machines (SVM), gaussian regression model and polynomial regression.

The validation data 43 is used for evaluating all generated forecasting models in the step 47 for selecting the best performing forecasting model among them. Selection of the best performing forecasting model may be based for example based on least average difference or any other applicable error measure between forecasted charging times generated by the plurality of generated models and actual charging times comprised in the validation data. Validation data 43 does not overlap with the training data 42. Validation step 47 may further comprise finetuning of parameters of the forecasting model using the validation data 43.

The selected forecasting model cannot be tested using the same data that was used for selecting the best performing forecasting model. Thus, a test data 44 portion of the data cluster is determined that does not overlap with the training data 42 and validation data 43.

The test data 44 is used in the step 48 to test performance of the selected forecasting model, and values or labels generated by the forecasting model are stored to enable tracking how performance of the selected charging time forecasting model evolves over time. Preferably, the result of the test performed in the step 48 is stored in the step 49 as part of or in association with the forecasting model. A result of the test step 48, such as one or more result values, may be stored as a characterizing value of the respective charging time forecasting model. The result may be a value indicating accuracy of the forecast such as mean square deviation, MSE. By comparing these result values of charging time forecasting models for the same data and EV cluster over time, accuracy of forecasting models for each EV cluster can be tracked over time. The best performing charging time forecasting model is stored by the computer device or system such that it can be used by the charging stations for real-time forecasting of charging times. Selected and tested forecasting models may be stored centrally so that they are available over a data communication connection or forecasting models may be distributed to each charging station over data communication connections. The testing step 48 may occasionally give a result, that a previously generated charging time forecasting model performs better, in other words is more accurate than the new one. In such case, the previous charging time forecasting model may be maintained and the new one is discarded and not provided for use at the charging stations.

The same learning, validation and testing process is preferably repeated for each applicable data cluster comprised in the data collection 34, each data cluster concerning a respective determined electric vehicle cluster.

The system may generate charging time forecasting models to different electric vehicle clusters using at least partially different data fields. This enables taking into account for example different charging event behavior patterns associated with different electric vehicle clusters. All charging event forecast models are provided for use of the plurality of charging stations. This can be achieved for example by uploading over the data communication network all generated charging event forecast models to each charging station or to a computer device shared by multiple charging stations of a charging site or charging event forecast models may be stored remotely and made available to charging stations over a data communication connection. Providing the charging time forecasting models at the charging stations is preferred, because it reduces latency caused by possible delays in data communication connections, thus facilitating real-time operation thereof.

Upon detecting initiation of a new charging event, the charging station identifies the vehicle or a vehicle cluster and uses this information for forecasting charging time for the initiated charging event. The charging station determines an applicable vehicle cluster based on the vehicle identification and/or vehicle cluster information and performs charging time forecasting based on the respective determined forecasting model. An exemplary method for identifying a vehicle is disclosed in the priority patent application FI20216007, herein incorporated by reference. If the vehicle cannot be identified, the charging time forecasting model to be applied can be selected based on a more generic EV cluster instead of more specific EV cluster. The more specific the selected charging time forecasting model is, the better and more accurate forecast can be expected.

If the identified vehicle does not seem to fit into any of the existing EV clusters, a new electrical vehicle cluster is determined as soon as enough charging event data has been obtained. In a typical case, a reasonably reliable charging time forecasting model can be generated based on charging event data of twenty (20) charging events that pass all determined filtering criteria during the data processing and charging time forecasting process.

As used herein, a computer device refers to any electronic device comprising a processor, such as a general-purpose central processing unit (CPU), a specific purpose processor or a microcontroller. A computer device is capable of receiving data (an input), of performing a sequence of predetermined operations thereupon, and of producing thereby a result in the form of information or signals (an output). Depending on context, the term “computer” will mean either a processor in particular or can refer more generally to a processor in association with an assembly of interrelated elements contained within a single case or housing. A computer system refers to a system that comprises more than one computer device, which are in data communication connection with each other.

The systems and methods described herein may be embodied by a computer program or a plurality of computer programs, which may exist in a variety of forms, both active and inactive, in a single computer system or across multiple computer systems. For example, they may exist as software program(s) comprised of program instructions in source code, object code, executable code or other formats for performing some of the steps. Any of the above may be embodied on a computer readable medium, which include storage devices and signals, in compressed or uncompressed form.

As used herein, a computer-readable medium or storage medium can be any means that can contain, store, communicate, or transport a program for use by or in connection with the computer program execution system, apparatus or device. The computer readable medium can be, for example but not limited to, an electronic, magnetic, optical, electromagnetic, infrared, or semiconductor system, apparatus, device, or propagation medium. A non-exhaustive list of more specific examples of the computer-readable medium can include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CDROM) or like.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A method of forecasting charging time of electric vehicles, comprising:

receiving charging event data over a data communication network, wherein the charging event data is received from a plurality of charging stations, and wherein the charging event data received from a charging station of the plurality of charging stations comprises at least one of operating conditions of the charging station, configuration of the charging station, and temperatures of components of the charging station, filtering received charging event data, wherein the filtering is configured to discard at least one piece of the charging event data or disable use of at least one piece of the charging event data, processing the remaining charging event data after said filtering to generate a data collection comprising sample data, obtaining from the data collection a data cluster representing sample data associated with a selected electric vehicle cluster, generating a charging time forecasting model for the selected electric vehicle cluster on basis of the obtained data cluster, wherein the charging time forecasting model is generated by a machine learning method comprising:

training a plurality of charging time forecasting models based on a first portion of the data cluster, selecting the best performing charging time forecasting model among the plurality of trained charging time forecasting models based on an evaluation performed on basis of a second portion of the data cluster, and testing the selected charging time forecasting model based on a third portion of the data cluster, repeating said obtaining the data cluster and generating the charging time forecasting model for a plurality of different data clusters to generate a charging time forecasting model for each of a plurality of different electric vehicle clusters, and upon detecting initiation of a new charging event of an electric vehicle, identifying the electric vehicle or the vehicle cluster of the electric vehicle, and determining the selected vehicle cluster for the electric vehicle, selecting the charging time forecasting model to be applied on the new charging event based on the selected electric vehicle cluster, and applying the selected charging time forecasting model on the charging event of the electric vehicle comprised in the selected electric vehicle cluster.

2. The method according to claim 1, wherein the step of processing comprises obtaining samples of the filtered charging event data, and pre-processing the obtained samples, wherein the pre-processing comprises at least one of:

removing effects of dynamical changes in the obtained samples caused by parallel charging events, and enhancing samples in the data collection by adding therein enhancement data determined based on data comprised in the obtained samples.

3. The method according to claim 1, wherein the filtering received charging event data comprises discarding or disabling data based on:

determining that charging apparatus configuration associated with a piece of charging event data is not known, discarding overrepresented charging event data such that resulting charging event data represents charging events evenly spread over the year, discarding charging event data associated with preselected charging station power configurations, and/or determining that the charging event data is associated to a charging event involving amount of charging energy and/or charging time that is below a predetermined threshold.

4. The method according to claim 1, wherein an obtained data cluster is rejected from being used for charging time forecasting model generation if sample data therein is determined to be unreliable.

5. The method according to claim 1, wherein the obtained data cluster is filtered to remove one or more samples from the data cluster that are determined to deviate from a majority of samples in the data cluster.

6. The method according to claim 1, wherein the plurality of charging time forecasting models are trained using a regression-based machine learning method such as one of linear regression, ridge regression, neural network regression, lasso regression, random forest, KNN model, support vector machines (SVM), gaussian regression, polynomial regression and decision tree regression such as Gradient Boosting Decision Tree (GBDT).

7. The method according to claim 1, wherein results of the testing the selected charging time forecasting model are stored along with the respective charging time forecasting model for tracking performance of the charging time forecasting model over time.

8. A computer program product comprising a non-transitory computer readable medium comprising computer executable code, that causes a computer device or a computer system to execute the method according to claim 1.

9. The method according to claim 1, further comprising:

providing the selected charging time forecasting model for the plurality of charging stations over the data communication network, and applying, by a charging station of the plurality of charging stations, the charging time forecasting model to provide, in real time, a charging time forecast during a charging event of an electric vehicle comprised in the selected electric vehicle cluster.

10. The method according to claim 1, further comprising:

estimating energy consumption by the electric vehicle during the charging event to improve reliability of the charging time forecasting.

11. A system configured to forecast charging time of electric vehicles, the system comprising a plurality of charging stations communicatively coupled to a computer device or computer system over a communication network, wherein the plurality of charging station are configured to obtain and send charging event data to the computer device or computer system, and wherein the computer device or computer system is configured:

to receive charging event data from the plurality of charging stations over a data communication network, the charging event data received from a charging station of the plurality of charging stations comprises at least one of operating conditions of the charging station, configuration of the charging station, and temperature of components of the charging station, to filter received charging event data to discard at least one piece of the charging event data or disable use of at least one piece of the charging event data, to process the remaining charging event data after said filtering to generate a data collection comprising sample data, to obtain from the data collection a data cluster representing sample data associated with a selected electric vehicle cluster, to generate a charging time forecasting model for the selected electric vehicle cluster on basis of the obtained data cluster, wherein the charging time forecasting model is generated by a machine learning method performed by the computer device or computer system, the method comprising:

training a plurality of charging time forecasting models based on a first portion of the data cluster, selecting the best performing charging time forecasting model among the plurality of trained charging time forecasting models based on an evaluation performed on basis of a second portion of the data cluster, and testing the selected charging time forecasting model based on a third portion of the data cluster, to repeat said obtaining the data cluster and generating the charging time forecasting model for a plurality of different data clusters and for generating a charging time forecasting model for each of a plurality of electric vehicle clusters, and to provide the plurality of generated charging time forecasting models to the plurality of charging stations, and wherein the charging station is configured:

upon detecting initiation of a new charging event of an electric vehicle, to identify the electric vehicle or the vehicle cluster of the electric vehicle, and to determine the selected vehicle cluster of the electric vehicle, to select the charging time forecasting model to be applied on the new charging event based on the selected vehicle cluster, and to apply the selected charging time forecasting model on the charging event of the electric vehicle comprised in the selected electric vehicle cluster.

12. The system according to claim 11, wherein the computer device or computer system is configured to process the remaining charging event data by obtaining samples of the filtered charging event data, and pre-processing the obtained samples, wherein the pre-processing comprises at least one of:

removing effects of dynamical changes in the obtained samples caused by parallel charging events, and enhancing samples in the data collection by adding therein enhancement data determined based on data comprised in the obtained samples.

13. The system according to claim 11, wherein the computer device or computer system is configured to filter received charging event data by means of discarding or disabling data based on:

determining that charging apparatus configuration associated with a piece of charging event data is not known, discarding overrepresented charging event data such that resulting charging event data represents charging events evenly spread over the year, discarding the charging event data associated with preselected charging station power configurations, and/or determining that the charging event data is associated to a charging event involving amount of charging energy and/or charging time that is below a predetermined threshold.

14. The system according to claim 11, wherein the computer device or computer system is configured to reject an obtained data cluster from being used for charging time forecasting model generation if sample data therein is determined to be unreliable.

15. The system according to claim 11, wherein the computer device or computer system is configured to filter the obtained data cluster to remove one or more samples from the data cluster that are determined to deviate from a majority of samples in the data cluster.

16. The system according to claim 11, wherein the computer device or computer system is configured to train the plurality of charging time forecasting models using a regression-based machine learning method such as one of linear regression, ridge regression, neural network regression, lasso regression, random forest, KNN model, support vector machines (SVM), gaussian regression, polynomial regression and decision tree regression such as Gradient Boosting Decision Tree (GBDT).

17. The system according to claim 11, wherein the computer device or computer system is configured to store results of the testing the selected charging time forecasting model along with the respective charging time forecasting model for tracking performance of the charging time forecasting model over time.

18. The system according to claim 11, wherein the computer device or computer system is further configured:

to provide the charging time forecasting model available to the plurality of charging stations over the data communication network, and wherein the charging station of the plurality of charging stations is configured to:

apply the charging time forecasting model to provide, in real time, a charging time forecast during a charging event of an electric vehicle comprised in the selected electric vehicle cluster.

19. The system according to claim 11, wherein the charging station is further configured:

to estimate energy consumption by the electric vehicle during the charging event to improve reliability of the charging time forecasting.

* * * * *